United States Patent [19]

Oechsle et al.

[11] Patent Number: 5,300,234

[45] Date of Patent: Apr. 5, 1994

[54] METHOD OF FILTERING BEVERAGES AND CHEMICAL, PHARMACEUTICAL, OR SIMILAR LIQUIDS

[75] Inventors: Dietmar Oechsle, Schwäbisch Gmünd; Wolfgang Baur, Waldstetten; Ludger Gottkehaskamp, Schwäbisch Gmünd, all of Fed. Rep. of Germany

[73] Assignee: Schenk-Filterbau gesellschaft mit beschränkter, Waldstetten, Fed. Rep. of Germany

[21] Appl. No.: 900,506

[22] Filed: Jun. 17, 1992

Related U.S. Application Data

[63] Continuation of Ser. No. 708,481, May 31, 1991, abandoned.

[30] Foreign Application Priority Data

Jun. 2, 1990 [DE] Fed. Rep. of Germany ....... 4017855
Mar. 28, 1991 [DE] Fed. Rep. of Germany ....... 4110252

[51] Int. Cl.$^5$ ............................................. B01D 37/02
[52] U.S. Cl. .................................... 210/778; 210/193; 210/505
[58] Field of Search ............... 210/503, 505, 506, 507, 210/777, 778, 193, 411

[56] References Cited

U.S. PATENT DOCUMENTS

| | | | |
|---|---|---|---|
| 4,238,334 | 12/1980 | Halbfoster | 210/505 X |
| 4,297,211 | 10/1981 | Hiesinger et al. | 210/411 X |
| 4,710,298 | 12/1987 | Noda et al. | 210/505 |
| 5,008,018 | 4/1991 | Raible | 210/778 X |

FOREIGN PATENT DOCUMENTS

0031522 1/1984 European Pat. Off. .
1010058 9/1954 Fed. Rep. of Germany .
3626378 2/1988 Fed. Rep. of Germany .

OTHER PUBLICATIONS

Published German PCT Application SN PCT/DE86/00117; Mar. 19, 1986.
F. Brenner and D. Oechsle; "Filtermedien im Raster—elektronenmikroskop (REM)"; (1985); pp. 2-7.
Dr. D. Oechsle and H.-P. Feuerpeil; "Struktur und ... Flüssigkeitsfiltration"; Dec. 12, 1984.

*Primary Examiner*—Frank Spear
*Attorney, Agent, or Firm*—Robert W. Becker & Associates

[57] ABSTRACT

A method of filtering beverages and other liquids. To avoid the considerable ecoproblems encountered with the filter aids of known procedures, which must be thrown away, the filtering active structure of the inventive filter aids is maintained so that they may be reused as often as required. A mixture of filter aids of varying morphological and physical components is used, and constitutes a minimum of two components, namely one component of specifically heavy, chemically stable metal and/or metal oxide and/or carbon particles of fibrous and/or granular structure, and a further component, for building up the filter cake and increasing its volume, of synthetic and/or cellulose fibers having a fiber length of 1 to 5000 μm and a fiber thickness of 0.5 to 100 μm. To increase the filtering efficiency of the filter cake of the aforementioned components, a further component may be added that comprises fibrillated or fanned out synthetic and/or cellulose fibers, preferably having a fiber length of 500 to 5000 μm and a fiber thickness of 0.5 to 20 μm. The components are intensively mixed to form a homogeneous mixture, and are dosed to the liquid that is to be filtered.

23 Claims, 1 Drawing Sheet

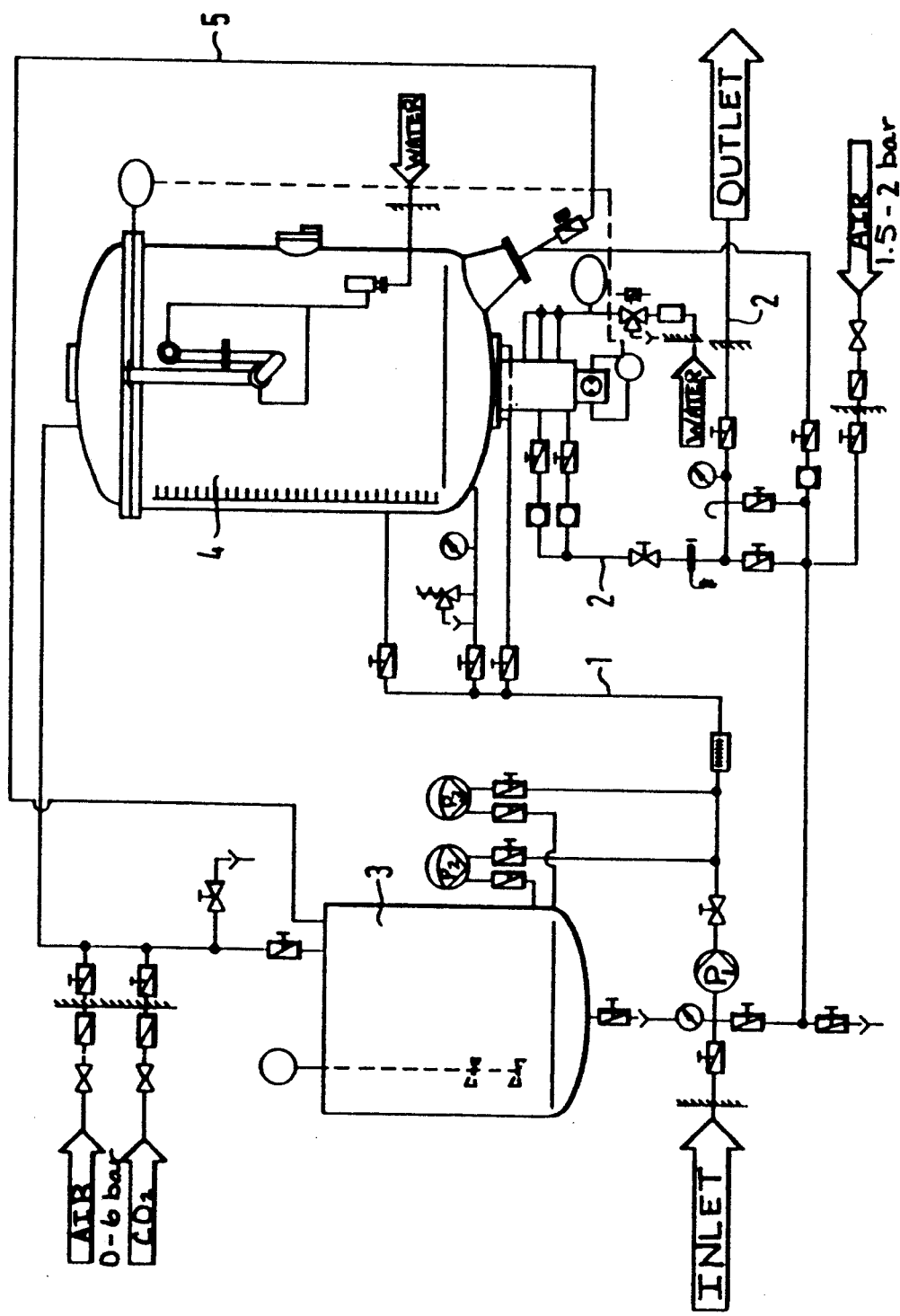

METHOD OF FILTERING BEVERAGES AND CHEMICAL, PHARMACEUTICAL, OR SIMILAR LIQUIDS

This application is a continuation of application Ser. No. 708,481 filed May 31, 1991, now abandoned.

BACKGROUND OF THE INVENTION

The present invention relates to a method of filtering beverages and chemical, pharmaceutical, or similar liquids by separating insoluble particles, including those having colloidal structures, out of the liquid, whereby various filter aid components are dosed to the untreated, i.e. showing cooler sludges, liquid (unfiltered matter) for forming a filter cake by deposition; thereafter, the solid matter particles retained in the filter cake after having been deposited are rinsed out and the filter aids as well as possibly added stabilizers are regenerated for reuse.

For the filtration of liquids, especially suspensions that contain solid matter, it is known to use in addition to the actual filter, for example the mechanical filter elements of a vessel filter, filter aids. In cases of suspensions containing a small amount of solid material, these filter aids are intended for facilitating the formation of a filter cake that is removable from the surface of the filter elements, or in cases of slimy solid matter, is intended to loosen up the very tight cake that is formed. The filter aids are added directly to the suspension that is to be filtered and are deposited to form a cake for the preliminary clarification of the unfiltered matter (deposition filtration). Common filter aids are cellulose, silica gel, diatomite, perlites, charcoal, wood dust, and similar materials. These filter aids work altogether physically-mechanically, and thus do not change the chemical composition of the liquid and are insoluble. During deposition of the filter aids, numerous capillaries are formed in the filter cake that are small enough to retain the solid material, but are also numerous enough to ensure an optimum permeability. Classical filters for the preliminary clarification are frame or vessel filters; the filter aids used in such filters are useless after being exhausted or used up, and must be thrown away and sanitized as waste.

In cases where this preliminary clarification (preliminary filtration) alone does not provide the high requirements with regard to quality, for example in the case of high-quality beverages such as beer or wine, including such requirements as so-called gloss quality or the biological preservability, there is provided in addition a final clarification, a so-called sterilization or degermination filtration. For this purpose, layer frame filters or plate-like arranged filter elements in vessel filters, filter layers that are covered on both sides in filter modules, and/or membrane filters are used. As raw materials for layer filters or filter sheets, organic and inorganic materials that are generally fibrous or granular are used, for example celluloses of wood, cotton, synthetic fibers, kieselguhrs, perlites, $\alpha$-alumina, as well as kaolin. In this connection, kieselguhrs serve to increase the filtration activity and perlites serve for loosening the lamellar structure and hence to increase the pore volume or sludge volume. Since both of these materials are floury, they weaken the mechanical stability of the filter bed, so that in the case of pressure thrusts or surges, for example due to mistreatment or misoperation, the filter sheets, particularly in the case of sterilization filtration, can break through, thereby greatly impairing the quality of the filtration. For the sake of safety, frequently provided downstream of such filters, i.e. on the sterile side, are in addition sterile filters having a fine pore size and a real screening efficiency, for example membrane filters having limber or resilient materials. In order to reduce the environmental impact of the useless filter aids that result in large quantities from the heretofore known procedures, and that must be stored in dumps at considerable expense, procedures for prolonging the exposure times of these filter aids have become known. DE-OS 36 26 378 discloses a procedure for the deposition filtration of beverages, in accordance with which a chemically regeneratable filtering material of powdery alumina is used.

In the PCT application publication number WO86/05511, a procedure for the final clarification and stabilization of liquids containing polyphenols and/or proteins is described, where the liquid that is to be reclarified and stabilized is preclarified by means of a centrifuge, is then mixed with a mixture of filter aids that retains very fine sludge material and stabilizers that absorb polyphenols and proteins, whereupon this is transferred as a suspension into a device that is suitable for the retention of solid material. The solid material cake that is built up in this device is regenerated after the conclusion of the treatment of the liquid in order to recover the filter aids and the regeneratable stabilizing material. This is accomplished with a 1 to 2% hydrous NaOH solution at a temperature of 50° to 60° C. In so doing, the known filter aid components, namely diatomites, cellulose fibers and/or granules, for example polyamides, halogenated polyethylene and/or polypropylene, especially fluoridated polyethylene, are used.

With the known filtering agents used in this procedure, the filtration-active structure thereof changes so much during the chemical regeneration that the filtration characteristics are to a great extent negatively influenced and the permeability and filtration intensity of the filter aids change, so that after a certain time of exposure, disposal thereof is required. Another filtering procedure on the market uses a self-contained filter that comprises two covers and, depending upon the filtration capacity, has several filter elements. These filter elements could be shifted on lifting rods via a special lifting device. For the preliminary and/or final clarification, cellulose, perlites, diatomite, and synthetic fibers are used that can be flushed onto the horizontal filter elements with warm water. A regeneration is effected with chemical agents outside of the filtering device. Also with this known procedure, the used filter aids must, despite extended exposure time, be disposed of as waste at considerable expense.

EP 0 031 522 B1 discloses a procedure for filtering beverages, particularly beer, according to the precoat filtration process, according to which as filter aid an agent is used that fully or partially consists of fibers of practically pure silicic acid with a staple length of approximately 30 to 7000 $\mu$m and a diameter of approximately 4 to 20 $\mu$m. The silicic acid is gained by dry spinning hydrous silicate of sodium and treating the gained sodium water glass fibers for converting the sodium silicate into silicic acid with hydrogen ion containing acid or saline solutions. In so doing, a filter aid can also be used that contains fibers of silicic acid to which up to 50% by weight of fiber shortcut of organic fibers have been added.

DE-AS 10 10 058 discloses that for a procedure for making a filter aid for beer or the like, degreased aluminum plate-like powder is treated in hot water in such a way that it covers itself with a boehmite coat. An aluminum plate-like powder treated in this way is supposed to provide alone or in combination with guhrs or other filter aids an improvement of the biological quality and the gloss quality of beer or the like.

Proceeding from the state of the art according to the aforementioned PCT application WO86/05511, it is an object of the present invention to provide a method or procedure for filtering beverages and chemical, pharmaceutical, or similar liquids in the general way described above, according to which the filtering-active structure of the filter aid used is maintained during its regeneration, the filtering characteristics remain unchanged despite repeated use, and the environment-polluting disposal of the filter aid is eliminated.

SUMMARY OF THE INVENTION

This object is realized by the method of the present invention, which is characterized primarily in that for the deposition for the filter cake, a mixture of filter aids of varying morphological and physical properties is used to provide components that are resistent, i.e. inert, to solvents, such as water, lyes, acids, in the concentrations required for the cleaning, thereby maintaining during regeneration their filtering properties, with a mixture containing at least the following components:

a) a component, which causes deposition of the filter cake and increases its density, of specifically chemically stable metal particles and/or metal oxide particles and/or carbon particles of fibrous and/or granular structure, b) a further component of synthetic and/or cellulose fibers having a fiber length of 1 to 5000 $\mu$m and a fiber thickness of 0.5 to 100 $\mu$m.

With the procedure pursuant to the present invention, filter aid mixtures are used that are inert, i.e. resistant, to acids, lyes, tensides, and oxidizing agents at the concentrations required for the regeneration, whereby these mixtures fully maintain their filtering properties during regeneration. In contrast to known filter aids, pursuant to the present invention a filter cake is built up from a combination of filter aids of varying morphology and physical parameters, as a result of which it is possible to use one and the same filter cake repeatedly not only for the preliminary filtering but also for the final filtration after a conditioning. The component a) of the inventive method ensures a perfect deposition of the filter aid mixture, particularly preventing the filter cake from being swept away, and increases the stability as well as in particular the mean density of the filter cake mixture. The component b) enlarges in the desired manner the filter cake volume that is to be deposited, and hence the sludge room. In order to enlarge the filter cake volume, and hence the sludge room, the component b) may advantageously comprise dry milled or shortened synthetic and/or cellulose fibers, which will subsequently be abbreviated as component b1). In this connection, the dry milled or shortened synthetic and/or cellulose fibers, i.e. the component b1, advantageously have a fiber length of 1 to 5000 $\mu$m and a fiber thickness of 2 to 100 $\mu$m.

In the event that higher quality filtrates are required, for example in the case of beverages such as wine or beer, fibrillated or fanned out synthetic and/or cellulose fibers are used for the component b). These fibrillated or fanned out synthetic and/or cellulose fibers, which will subsequently be designated as component b2, advantageously have a fiber length of 500 to 5000 $\mu$m and a fiber thickness of 0.5 to 20 $\mu$m. As a result, the filtering efficiency of the filter cake is improved due to the tendency of this component toward felting deposit, which is also known as the formation of jellyfish.

If very high or the highest requirements are placed upon the filtration, particularly in the case of sterilization filtration in the form of a depth filtration, i.e. in case of the final filtration, it is recommended that the method be executed in such a way that the component b) comprise not only dry milled or shortened synthetic and/or cellulose fibers, i.e. the component b1, but also fibrillated or fanned out synthetic and/or cellulose fibers, i.e. the component b2.

Examples of dry milled or shortened cellulose fibers that can be used are presented in the article "Filtering media in the scanning electron microscope (REM)" by F. Brenner and D. Oechsle in the Brauwelt, year 125 (1985), book 4, p. 130–137 (see there FIG. 11), and in the article "Structure and function of various filtering media at the liquid filtration" by Dr. D. Oechsle and Dipl.-Ing. H.-O. Feuerpeil in the journal "confructa" 1/85 (see there FIG. 7) and may form components of the component b1. The same passages in the literature also show in FIG. 12 (Brauwelt) and FIG. 8 (confructa) asbestos-free filter flakes that are finest fibrillated as they are suitable for the component b2.

For the method according to the present invention, the specifically heavy mixture component a) comprises the following individual constituents or mixtures of these constituents, namely highly calcined oxides, preferably $\alpha$-alumina, zirconium oxide having a granular size fraction in the range of from 1 to 200 $\mu$m, sintered metal particles, especially sintered special or stainless steel particles having a granular size of from 1 to 500 $\mu$m and a pore size between 0 and 30 $\mu$m, and/or fibers, especially special or stainless steel fibers or carbon fibers having a fiber thickness of from 1 to 100 $\mu$m and a fiber length of from 0.05 to 5 mm. These specifically heavy components a) effect a stable, lasting filter cake.

Examples of synthetic fibers in conformity with component b) are polyethylene (PE), preferably high-density polyethylene (HDPE), polypropylene (PP), halogenated polyethylenes, polyoxymethalines (POM), polyamides (PA). As cellulose fibers, $\alpha$-cellose is preferably used. The cellulose is released by chemical treatment from all soluble components and is lye-resistant. With the method of the present invention, the filter cake that is to be deposited is consequently advantageously essentially formed by the components a) and b2. In this connection, it is important that all of the components of the filter aid mixture, prior to use, be stirred together intensively for a long time in the wet phase until homogenization is achieved.

A further subject matter of the present invention is a procedure for the preliminary and final clarification of liquids with one or more of the previously described filter aid mixtures. In this connection, the procedure is such that with one and the same filter aid mixture, first a preliminary filtration is carried out, and subsequently a final filtration is carried out, whereby during the preliminary filtration a filter aid mixture is continuously dosed to the unfiltered stream to thereby deposit a filter cake having a thickness of approximately 10 to 15 mm. By means of this continuous build-up of the filter cake, the so-called precoat filtration, a maximum sludge quantity can be built into the filter cake. After the sludge space in the filtering device has been exhausted, or after the maximum permissible pressure difference has been reached, the components of the filter liquid retained in the filter cake are rinsed out by solvents in which the retained components are soluble. This can be achieved, for example, via a 0.1 to 10% by weight hydrous sodium hydroxide and or soda solution at a temperature of 40° to 100° C. without impairment of the filter aid mixture and hence without impairment of its filtering activity. The liquid preliminarily filtered in this manner is then filtered by the filter cake that was built up during the preliminary filtration. After this filtration, the components retained in the filter cake are again rinsed out of the filter cake by appropriate solvents. The filter cake is then removed from the filter and is transferred to a separate container, is homogeneously suspended, and is thereafter used for renewed precoat filtration. Matter that has possibly been retained in the filter cake is, if necessary, and in a resuspended condition, also dissolved away by suitable solvents, for example 1% NaOH at 70° to 80° C. This procedure may be carried out in a discontinuous manner in a single enclosed filter, for example in a vessel filter. The procedure may also be carried out continuously, whereby in a first filter the deposition of the filter cake is effected via preliminary filtration, and in a second, downstream filter the final filtration (depth filtration) is carried out via a filter cake built up prior to the filtration by using one and the same filter aid mixture but with varying mixing proportions.

EXAMPLE ONE

The following is an example for carrying out the inventive method.

The mixture components a) and b) or a) and b2) for the preliminary filtration or for a preliminary and final filtration are first homogenized with an additional third mixing component by long stirring to form a uniform mixture, and are pre-deposited out of a dosing container into a water circuit and onto the filter elements of the filter until approximately 1000 to 2000 g/m² have been deposited thereon. This preliminary deposition is expedient because the pores of the webbing of the filter element, which may have a size of approximately 50 to 80 $\mu$, should be kept to a minimum in order via this preliminary deposition to obtain a high-quality filtering. After the preliminary deposition, further filter aid mixture, together with unfiltered material, is fed into the filter until the sludge space is filled or the permissible pressure difference of the vessel has been reached. In so doing, filter cakes having a thickness of approximately 20 to 25 cm are built up, whereafter the filtration is terminated by stopping the feed pump. The remaining unfiltered material is subsequently pressed out by pressure gas over the filter cake to empty the vessel. After this, the filter aid mixture may be regenerated by filling the vessel with water or hot water (in case the pressure difference is appropriately high or the sludge material is not water soluble, possibly accompanied by the addition of lye), whereby the agent filled in for the regeneration is circulated. Thereafter, the filter is again emptied and the filter cake is rinsed with water until the filter cake is again neutral. If all residue has been washed out, the sterilized filter cake built up in the filter is used for the final filtration or fine filtering of the prefiltered product by first conditioning the regenerated and sterilized filter cake and then carrying out the final filtration in the form of a depth filtration via the built-up filter cake without continuous filter aid dosing.

EXAMPLE TWO

The following is an example for the conditioning of the filter cake that takes placed during the inventive method.

A filter cake comprising 50% PE-fibers of mean fiber length of 1 to 2 mm and a mean fiber thickness of 30 $\mu$m, and 20% zirconium dioxide fibers as well as 30% zirconium dioxide granules of mean particle size of approximately 40 $\mu$m, which filter cake is inert to a 10% by weight solvent, preferably water, lyes, acids and/or oxidants, is conditioned after deposition has been effected and rinsing has been effected with the aforementioned solvents, by reducing the height of the filter cake by approximately 20% via dewatering at a pressure of, for example, 5 bar with inert gas, for example $CO_2$, to thereby obtain a desired permeability. The aforementioned solvents are constituted in such a way that the retained components in the filter cake are soluble out of the unfiltered material and have a temperature resistance up to a minimum of 100° C. The inventive filter aid mixture thus has a morphology and microstructure that does not lose its filtering activity during repeated filtering and regenerating operations, and is therefore continuously reusable. Furthermore, the filter cake comprised of the inventive filter aid mixture has a highly temperature-dependent expansion factor that facilitates rinsing-out of the retained particular particles out of the filter cake.

BRIEF DESCRIPTION OF THE DRAWING

The method of the present invention will now be described in conjunction with the accompanying schematic drawing, which illustrates an exemplary layout for practicing the inventive method.

DESCRIPTION OF PREFERRED EMBODIMENTS

Referring now to the drawing in detail, the liquid, for example beer, that is to be filtered is supplied to the filtering unit 4, for example a vessel filter, via pipe 1, and leaves the filtering unit via the pipe 2. The preliminary clarification (preliminary filtering) is effected during continuous dosing of the filter aids via dosing pumps $P_2$, $P_3$ into the liquid that is to be filtered (unfiltered stream), whereby the filter cake is deposited. The filter aid mixture suitable for the specific application is prepared for this purpose and is suspended in the container 3, for example in water or in the liquid that is to be filtered, in a weight ratio of 1:5 to 1:50, preferably 1:10 to 1:25. An example of a suitable composition is a mixture of a maximum of 75% PE-fibers, preferably 20 to 60%, having a mean fiber length of 1.2 mm, a mean fiber thickness of 30 $\mu$m, 10 to 40% zirconium dioxide fibers, preferably 15 to 20%, as well as 10 to 50% zirconium dioxide granules, preferably 25 to 45%, having a mean particle size of approximately 40 $\mu$m. After the conclusion of the preliminary clarification (preliminary filtering), the components from the unfiltered material retained in the filter cake are dissolved away or rinsed out with suitable solvents.

As previously mentioned, suitable solvents include water having a temperature of 50° to 100° C., preferably 70° to 90° C., 0.5 to 2% by weight hydrous NaOH solutions having temperatures of preferably 70° to 90° C., 1 to 2% by weight hydrous $HNO_3$ solutions, as well as 0.1 to 0.3% by weight perethanoic or peracetic acid, or hydrogen peroxide solutions, having a temperature of 20° to 40° C.

If necessitated by the required quality, a final filtering can be effected via the filter cake built up during the preliminary filtering without continuous addition of filter aids over the conditioned filter cake (depth filtration). The rinsing off of the filter cake that is thereafter required is effected in the same way as after the preliminary clarification. Thereafter, the filter cake is transferred from the filter by pressure through the pipe 5 into a separate container, for example the container 3, and may be used again for a further preliminary filtering.

A further subject matter of the present invention is a mixture particularly for filtering beverages and chemical, pharmaceutical, or similar liquids, preferably via preliminary and/or final filtration for depositing a reusable filter cake, which is distinguished by the following components:

a) specifically heavy, chemically stable metal particles and/or metal oxide particles and/or carbon particles of fibrous and/or granular structure, b) synthetic and/or cellulose fibers having a fiber length of 1 to 5000 μm and a fiber thickness of 0.5 to 100 μm and/or b2) synthetic and/or cellulose fibers, especially synthetic fibrils or fibrids, having a fiber length of 500 to 5000 μm and a fiber thickness of 0.5 to 20 μm.

The mixture comprised of the components a), b) is suitable for the preliminary clarification and, for high requirements with respect to the quality of the product that is to be clarified, especially for the final filtering (depth filtering), may be complimented with the component b2) in conformity with the desired requirements as regards quality. Essential for the desired filtering activity is that at least a portion of the synthetic and/or cellulose fibers be broken up mechanically, for example by dry milling or by fibrillating, in a longitudinal direction in order to obtain a structure of the fibers that has a favorable influence upon the filtering efficiency. This fibrillating or mechanically breaking up of at least a portion, preferably of the synthetic fibers (PE-fibers), is of particular importance when using the components for the final clarification. The fibrillating can be effected wet in a known manner, while a mechanically fanning out of fibers is expediently effected via dry milling, for example via wood mills.

The present invention is, of course, in no way restricted to the specific disclosure of the specification and drawings, but also encompasses any modifications within the scope of the appended claims.

What we claim is:

1. In a method of filtering beverages and liquids by separating insoluble particles, including the steps of dosing various filter aid components to the untreated or unfiltered, sludge-containing liquid to form a filter cake via deposition, thereafter rinsing out the solid material retained in the filter cake after the deposition, and regenerating the filter side, as well as stabilizers that may have been added, for reuse, the improvement comprising the steps of:

for said deposition of said filter cake, using a mixture of filter aid components that have different morphological and physical properties and are resistant, i.e. inert, to those concentrations of solvents necessary for cleaning to thereby maintain their filtering properties during said regeneration, with said mixture containing at least the following components:

a) a first component that causes said deposition of said filter cake and increases the density thereof, with said first component comprising at least one specifically heavy, chemically stable particle selected from the group consisting of metal particles, metal oxide particles, and carbon particles, with said particles having structures selected from the group consisting of fibrous and granular structures; and b) a second component comprising at least one fiber selected from the group consisting of synthetic and cellulose fibers, and having a fiber length of from 1 to 5000 μm and a fiber thickness of from 0.5 to 100 μm; and with said filter cake formed from said mixture physically-mechanically filtering the insoluble particles from the beverages and liquids.

2. A method according to claim 1, wherein to increase the filter cake volume and hence the sludge space, said second component b) comprises dry milled or shortened fibers selected from the group consisting of synthetic and cellulose fibers, thereby providing a third component b1).

3. A method according to claim 2, wherein said third component b1) has a fiber length of from 1 to 5000 μm and a fiber thickness of from 2 to 100 μm.

4. A method according to claim 1, wherein to increase the filtering efficiency of said filter cake, said second component b) comprises fibrillated or fanned out fibers selected from the group consisting of synthetic and cellulose fibers, thereby providing a fourth component b2).

5. A method according to claim. 4, wherein said fourth component b2) has a filter length of from 500 to 5000 μm and a fiber thickness of from 0.5 to 20 μm.

6. A method according to claim 4, in which said mixture for said filter cake essentially comprises said first component a) and said fourth component b2).

7. A method according to claim 1, in which said second component b) comprises not only dry milled or shortened fibers but also fibrillated or fanned out fibers, with said fibers being selected from the group consisting of synthetic and cellulose fibers.

8. A method according to claim 1, in which said specifically heavy mixture component is selected from the group consisting of individual constituents and mixtures thereof of the following: highly calcined oxides, including α-alumina and zirconium oxide, having a granular size fraction in the range of from 1 to 200 μm; sintered metal particles, including sintered special steel particles, having a granular size fraction in the range of from 1 to 500 μm and a pore size of from 0 to 30 μm; and fibers, including special steel fibers and carbon fibers, having a fiber thickness of from 1 to 100 μm and a fiber length of from 0.05 to 5 mm.

9. A method according to claim 1, in which said synthetic fibers are selected from the group consisting of polyethylene, including high-density polyethylene, polypropylene, halogenated polyethylenes, polyoxymethylene, and polyamide fibers.

10. A method according to claim 1, in which α-cellulose is used for said cellulose fibers.

11. A method according to claim 1, which includes the step of mixing together all of said filter aid mixture components, prior to use, in a wet phase until they are homogenized.

12. A method according to claim 1, for a preliminary and final filtration of said liquid using said filter aid mixture, including the steps of:

using one and the same filter aid mixture, first carrying out a preliminary filtration and subsequently carrying out a final filtration;

during said preliminary filtration, continuously dosing said filter aid mixture to said unfiltered liquid to thereby deposit a filter cake having a thickness of approximately 10-50 mm and enable the installation of a maximum sludge quantity in said filter cake via said continuous build-up thereof, and to thereby provide a prefiltered liquid;

after the sludge space in the filtering unit has been exhausted or the maximum permissible pressure difference has been reached, washing out the constituents of the filter liquid retained in said filter cake via solvent in which said retained constituents are soluble without impairing said filter aid mixture and hence the filtering activity thereof;

during said final filtration, again filtering said prefiltered liquid, for a depth filtration, via said washed free and sterilized filter cake that was formed during said preliminary filtration;

after termination of said final filtration, again washing out of said filter cake the constituents retained therein via appropriate solvents;

thereafter removing said filter cake from the filter and transferring same to a separate container for homogeneous suspension thereof and reuse for said deposition filtration.

13. A method according to claim 12, wherein said solvent for washing out constituents from said filter cake is selected from the group consisting of 0.1 to 10% by weight hydrous sodium hydroxide and soda solutions at a temperature of from 40° to 100° C., and said solvent, if necessary for dissolving out sludge material from said filter aid suspension, is 1% NaOH at from 70° to 80° C.

14. A method according to claim 12, which is carried out discontinuously in a single closed filter.

15. A method according to claim 12, further including the step of:

dissolving out of said filter aid after said homogeneous suspension of said filter cake, via suitable solvents, sludge material that may be retained in said filter cake even in the resuspended state.

16. A method according to claim 1, used for final clarification of beverages and chemical, pharmaceutical, and other liquids as a sterilization and depth filtration.

17. A method of filtering beverages and liquids by separating insoluble particles, including the steps of:

dosing various filter aid components to the untreated or unfiltered, insoluble particles containing liquid to form a filter cake via deposition;

thereafter rinsing out the solid material separated from the liquid and retained in the filter cake during deposition;

regenerating the filter aid components, as well as stabilizers that may have been added, for reuse;

for said deposition of said filter cake, using a mixture of filter aid components that have different morphological and physical properties and are resistant, i.e. inert, to those concentrations of solvents necessary for rinsing the filter cake and regenerating the filter aid components and the stabilizers to thereby maintain their filtering properties, said filter cake deposited from said mixture filtering exclusively physically-mechanically the insoluble particles from the beverages and liquids, with said mixture containing at least the following filter aid components:

a) a first component consisting of at least one specifically heavy, chemically stable particle selected from the group consisting of metal particles, metal oxide particles, and carbon particles, with said particles having structures selected from the group consisting of fibrous and granular structures; and b) a second component consisting of at least one fiber selected from the group consisting of synthetic and alpha-cellulose fibers, and having a fiber length of from 1 to 5000 $\mu$m and a fiber thickness of from 0.5 to 100 $\mu$m; and with said second component forming a structure of said filter cake, and with said first component introduced into said structure of said filter cake for causing said deposition of said filter cake and increasing the density thereof.

18. A mixture for the deposition and reuse of a filter cake for physical-mechanical filtration, said mixture being comprised of the following components:

a) a first component consisting of at least one specifically heavy, chemically stable particle selected from the group consisting of metal particles, metal oxide particles, and carbon particles, with said particles having structures selected from the group consisting of fibrous and granular structures; and b) a second component consisting of at least one fiber selected from the group consisting of synthetic and alpha-cellulose fibers, and having a fiber length of from 1 to 5000 $\mu$m and a fiber thickness of from 0.5 to 100 $\mu$m; and with said second component forming a structure of said filter cake, and with said first component introduced into said structure of said filter cake for causing said deposition of said filter cake and increasing the density thereof, said components being resistant, i.e. inert, to those concentrations of solvents necessary for rinsing the filter cake and regenerating said components to thereby maintain their filtering properties.

19. A mixture according to claim 18, in which said specifically heavy mixture component is selected from the group consisting of individual constituents and mixtures thereof of the following: highly calcined oxides, including $\alpha$-alumina and zirconium oxide, having a granular size fraction in the range of from 1 to 200 $\mu$m; sintered metal particles, including sintered special steel particles, having a granular size fraction in the range of from 1 to 500 $\mu$m and a pore size of from 0 to 30 $\mu$m; and fibers, including special steel fibers, glass fibers, and carbon fibers, having a fiber thickness of from 1 to 100 $\mu$m and a fiber length of from 0.05 to 5 mm.

20. A mixture according to claim 18, wherein said mixture contains component b) in the form of at least one of the components b1) and b2), with b1) being dry milled or shortened fibers, and b2) being fibrillated or fanned out fibers, whereby said b1) and b2) fibers are selected from the group consisting of synthetic and cellulose fibers.

21. A mixture according to claim 20, wherein said mixture contains components a), b1) and b2).

22. A mixture according to claim 18, wherein said synthetic fibers are selected from the group consisting of polyethylene, including high-density polyethylene, polypropylene, halogenated polyethyelenes, polyoxymethylene, and polyamide fibers and mixtures thereof, with said fibers having a fiber length of from 500 to 5000 $\mu$m and a fiber thickness of from 2 to 100 $\mu$m.

23. A mixture according to claim 18, wherein said mixture is homogenized and kept in a moist state for use.

* * * * *